Oct. 5, 1926.  
J. B. TRIPLETT  
1,602,134  
RELEASABLE SLIP SOCKET FISHING TOOL  
Filed Sept. 2, 1924    2 Sheets-Sheet 1
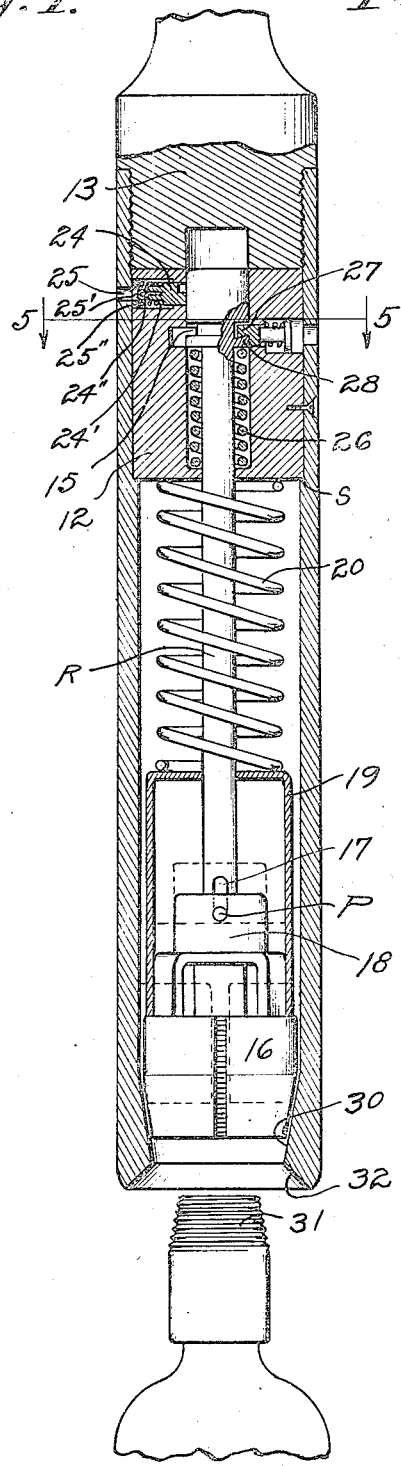
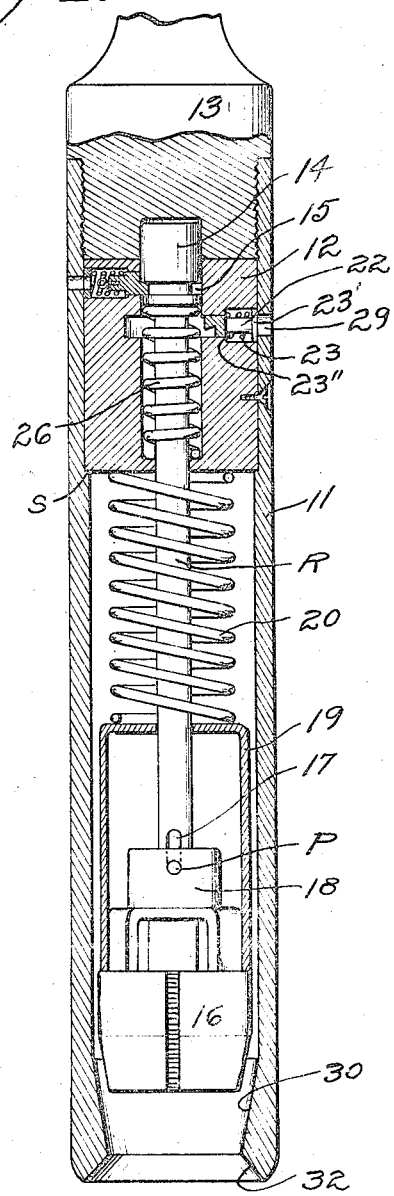
INVENTOR.  
JAMES B. TRIPLETT,  
BY  
ATTORNEY.

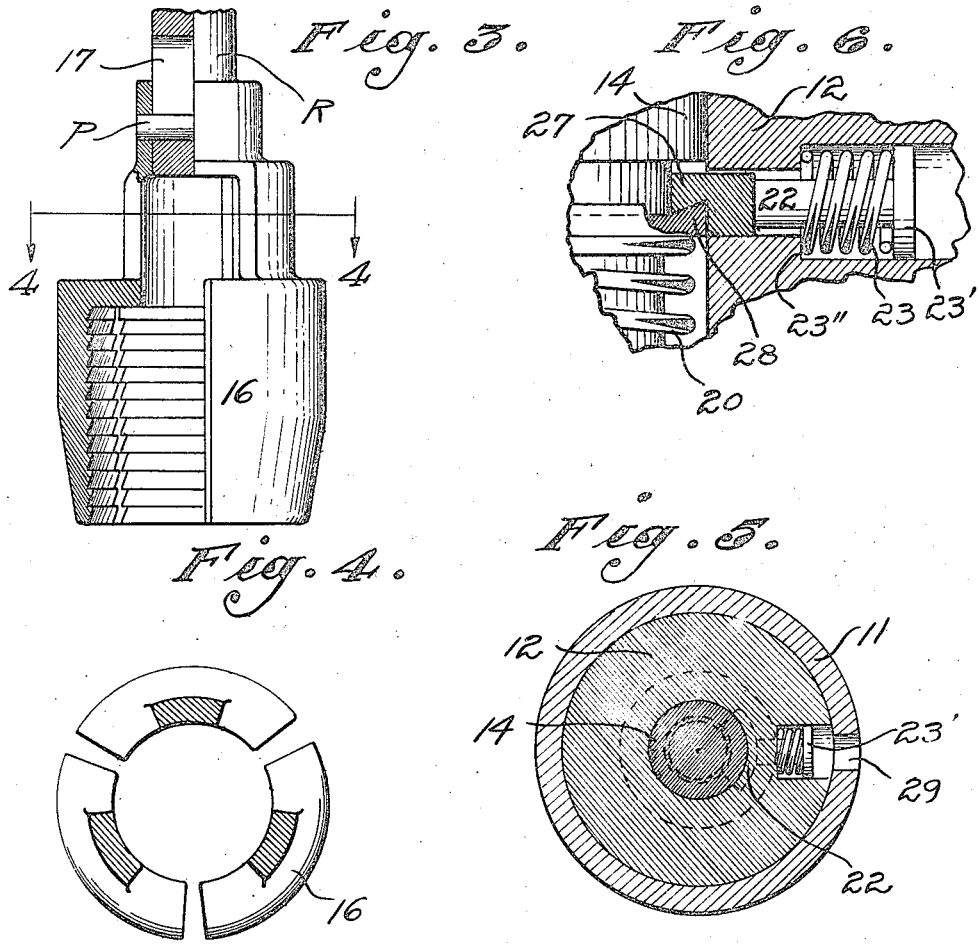

Patented Oct. 5, 1926.

1,602,134

UNITED STATES PATENT OFFICE.

JAMES B. TRIPLETT, OF LONG BEACH, CALIFORNIA.

RELEASABLE SLIP-SOCKET FISHING TOOL.

Application filed September 2, 1924. Serial No. 735,331.

My present invention is a slip-socket "fishing" tool in which means are provided permitting the release of a "fish" engaged thereby, in case the same is too firmly lodged for immediate removal.

It is an object of this invention to provide a fishing tool comprising slips, which may be resiliently connected and may be automatically spread within predetermined limits to engage a fish (such as the threaded "pin" on the upper end of a drilling tool) and whose grip shall be automatically tightened by the lifting of the string of pipe to which the same may be secured, but which shall nevertheless be associated with means whereby the direct lowering of said string, subsequently to even a slight lifting of the same, shall permit the disengagement of a fish therefrom.

An advantageous embodiment of my invention, in which the slips are releasable by a longitudinal or axial movement of the supporting string, may comprise slips resiliently interconnected by means of a collar and housed in a substantially cylindrical shell, the latter being preferably secured to a special sub and provided with inclined slip-engaging surfaces within its lower end; and said shell may house not only the mentioned slips but also novel control means, including springs and dogs disposed about a central rod, which may be provided at its upper end with a slotted head and at its lower end with a pin-and-slot connection to the mentioned collar, said control means causing either the engagement or the release of a fish, as hereinafter described.

Other objects of my invention will be understood from the following description of an advantageous embodiment thereof, taken in connection with the appended claims and the accompanying drawings in which, Fig. 1 is, for the most part, a median longitudinal section through a fishing tool illustrating my invention and showing my device as "set", in readiness for the engagement of a fish.

Fig. 2 is a similar view, but showing the slips as held in a releasing or non-gripping position.

Fig. 3 is a self-explanatory detail view showing a preferred construction and arrangement of slips relatively to a collar from which they are resiliently supported by means of a slotted rod.

Fig. 4 is a horizontal sectional view taken substantially as indicated by the line 4—4 of Fig. 3.

Fig. 5 is a horizontal sectional view, on an intermediate scale, taken substantially as indicated by the line 5—5 of Fig. 1.

Fig. 6 is an enlarged detail view of a setting dog and associated parts, as hereinafter described.

Referring to the details of that specific embodiment of my invention chosen for purposes of illustration, 11 may be a slip-enclosing shell, in the upper end of which a plug 12 is shown as secured by threaded engagement of said shell with a special sub 13, the plug 12 being shown as held between said sub and a shoulder S in said shell. Extending into a central bore of the plug 12, and optionally also into a corresponding cavity in the sub 13, is shown the head 14 of a rod or mandrel R, this head, or its equivalent, being provided with a circumferential slot or channel 15, for engagement by control dogs, as hereinafter set forth.

On the lower end of the mandrel R, slips 16, or their equivalent, may be secured, as by means of a pin P, which may extend through a slot 17 in the rod R and also through a collar 18, with which the slips are shown as resiliently connected by means of integral springs. Bearing against the tops of the slips 16 is shown a depressing device comprising a cup 19, which may be forced thereagainst by means such as a compression spring 20, shown as confined between the cup 19 and the plug 12.

As shown in Figs. 1, 2, 5 and 6, I may provide a setting dog 22 with a compression spring 23, shown as confined between a flange 23' on said dog and a seat 23", formed on the plug 12; and I may provide also a releasing dog 24, or its equivalent, the releasing dog shown being pressed inwardly by a spring 24', and optionally provided with a retrieving eye 24" accessible through openings 25, 25', provided respectively in the shell 11 and in a retaining button 25", which may be threaded into the plug 12.

When the device is to be set by bringing the parts into the positions shown in Fig. 1, in readiness for lowering to the bottom of a well containing a fish, the rod or mandrel R may be forced downwardly against the action of a retracting compression spring 26, or its equivalent whose tendency is opposed to that of the mentioned spring 20, and the setting dog may be forced inwardly against the action of the spring 23, so as to enter the channel or slot 15 provided in the head 14. The dog 22 is then held in place by the co-action of a lip 27, formed thereon, and a lip 28, formed by the undercutting of the channel or slot 15,—an opening 29 being shown as provided through the shell 11, or its equivalent, to permit the application of an inward pressure upon the outer end of the setting dog 22, to set the same. To prevent accidental entrance of foreign matter therethrough, the holes 25 and 29, may be closed by means of suitable plugs, or the like, not shown.

When the above mentioned parts are in the indicated positions, the slips 16 are intended to rest loosely within the conical face 30 of the shell 11, but they are not in any way constricted thereby,—their clearance being preferably such as to permit either inward or outward relative movement, within the bowl.

In use, this tool, when set, is intended to be lowered so that, for example, the threaded portion 31 of a lost bit may be directed between the slips 16, as by a lower conical face 32, shown as also provided upon the shell 11. The end 31 of the lost bit may then force the slips relatively upward, against the action of the spring 20 or its equivalent, for a distance equivalent to the length of the slot 17, at the same time expanding the same. The slips are thus forced into the larger bore, above the inclined face 36, and in which they are allowed to expand, somewhat as indicated by dotted lines in Fig. 1, the fish 31 being wedged therebetween.

The next operation is a lifting of the string of tubing. This results in an upward movement of the shell 11 and the plug 12 relatively to the other parts of the device; and this upward movement immediately releases the setting dog 22, which moves outwardly to permit a relative movement between the plug 12 and the rod or mandrel R. The slips 16 are, as a consequence of this relative movement and of their consequent contact with the inclined face 30, forced into a firm gripping engagement with the fish 31. The tool may then bring the fish to the surface. If, however, the fish is so firmly lodged that it cannot be elevated, the string is again lowered; and this second lowering, the setting dog 22 being held in retracted position by the spring 23, moves the shell and plug relatively to the other parts of the device sufficiently to cause the slot 15 to be engaged by the upper releasing dog 24, which then holds the rod or mandrel R, and thereby the slips 16, in an elevated and releasing or non-gripping position, substantially as indicated in Fig. 2. This position may be, for example, one and a half inches above that in which the slips rest when in a fish-retaining position. The jaws of the slips, when in this released position, are so free to move outward that they allow the slips, and the entire device, to be freed from engagement with the fish and to be elevated to the surface of the well.

Although I have herein described a single complete embodiment of my invention, it will be understood that various features thereof might be independently employed and also that various modifications might be made, by those skilled in the art, without the slightest departure from the spirit and scope of my invention as the same is indicated above and in the following claims.

For example, my tool can be employed in the recovery of either rotary or "standard" tools, as used in deep oil well drilling; and it can be made with slips and a shell or bowl elongated to any desired degree, adapting the same to go over a tool of any specified length,—or even over a half-length of pipe (such as may result from a twist-off in rotary drilling) to take a grip over a coupling at the lower end thereof. I may also provide any usual or preferred means for preventing relative rotation between the slips 16 and the surrounding bowl, thereby adapting the organization to be used alternatively as a backing-off tool.

I claim as my invention:

1. A fishing tool comprising: a slip-enclosing element; slips movable relatively thereto into either a fish-retaining or a fish-releasing position; a mandrel, secured to said slips by means permitting limited relative movement between said slips and said mandrel, said mandrel being movable within said slip-enclosing element; means tending to move said mandrel simultaneously in opposite directions, said means including a plurality of spiral springs surrounding said mandrel; and slip-controlling devices which include means whereby the relative elevation of said enclosing element, after the engagement of a fish by said slips, is effective to tighten the grip thereof, and means whereby a subsequent depression of said element causes said slips to be retained in a fish-releasing position.

2. An organization as defined in claim 1 in which said slip-enclosing element is in the form of a shell provided at its lower end with an inwardly inclined face.

3. An organization as defined in claim 1 in which said slips are resiliently connected and provided with resilient means for their depression relatively to said slip-enclosing element.

4. An organization as defined in claim 1 in which said slip-controlling devices comprise settable means for holding said slips in a position adapting them to engage a fish.

5. An organization as defined in claim 1 in which said slip-controlling devices comprise a dog, operable upon the axial depression of said slip-enclosing element, to hold said slips in a fish-releasing position.

In testimony whereof, I have hereunto set my hand at Los Angeles, California, this 26th day of August 1924.

JAMES B. TRIPLETT.